(12) United States Patent
Kohl (10) Patent No.: US 12,320,123 B2
(45) Date of Patent: Jun. 3, 2025

(54) LIQUID FLOW DIVERTER

(71) Applicant: HUSQVARNA AB, Huskvarna (SE)

(72) Inventor: Peter Kohl, Illertissen (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/704,603

(22) PCT Filed: Sep. 5, 2022

(86) PCT No.: PCT/EP2022/074635
§ 371 (c)(1),
(2) Date: Apr. 25, 2024

(87) PCT Pub. No.: WO2023/072459
PCT Pub. Date: May 4, 2023

(65) Prior Publication Data
US 2024/0417978 A1 Dec. 19, 2024

(30) Foreign Application Priority Data
Oct. 26, 2021 (EP) ..................................... 21204811

(51) Int. Cl.
*E04D 13/08* (2006.01)
(52) U.S. Cl.
CPC ...... *E04D 13/08* (2013.01); *E04D 2013/0813* (2013.01)
(58) Field of Classification Search
CPC ..... E03B 3/02; E04D 13/08; E04D 2013/082; E04D 2013/0853
USPC ........... 138/111, 114; 52/11, 12, 16; 137/357
See application file for complete search history.

(56) References Cited

U.S. PATENT DOCUMENTS

| | | | |
|---|---|---|---|
| 2,800,925 A | 7/1957 | Tollefsen et al. | |
| 3,481,366 A | 12/1969 | Morronson | |
| 5,159,789 A * | 11/1992 | Haapanen | E04D 13/08 52/12 |

(Continued)

FOREIGN PATENT DOCUMENTS

| | | |
|---|---|---|
| DE | 8915204 U1 | 4/1990 |
| DE | 102005024300 A1 | 11/2006 |

(Continued)

OTHER PUBLICATIONS

International Search Report and Written Opinion of corresponding International Application No. PCT/EP2022/074635 mailed Nov. 28, 2022, all pages cited in its entirety.

(Continued)

*Primary Examiner* — David R Deal
(74) *Attorney, Agent, or Firm* — Burr & Forman LLP (57) ABSTRACT

A liquid flow diverter (130) for a downpipe (120) includes a body (132). The body (132) includes a channel profile (136) between a first end (131) and a second end (133). The channel profile (136) includes a helix shape and allows flow of a liquid therein. The body (132) further includes a liquid outlet (139) associated with the first end (131). The liquid outlet (139) allows fluid communication of the liquid flow diverter (130) with the downpipe (120). The liquid flow diverter (130) is characterized in that the body (132) is made of a partly rigid material with the helix shaped channel profile (136) having a lead (L) of at least a height (H) of the channel profile (136) at its first end (131).

11 Claims, 8 Drawing Sheets

(56) References Cited

U.S. PATENT DOCUMENTS

| | | | | |
|---|---|---|---|---|
| 5,490,538 A | * | 2/1996 | Marcel | E04D 13/08 |
| | | | | 137/561 A |
| 5,533,303 A | * | 7/1996 | Harvey | E03B 3/02 |
| | | | | 52/16 |
| 2006/0231149 A1 | * | 10/2006 | Kulkarni | G01F 1/42 |
| | | | | 138/44 |
| 2016/0033048 A1 | * | 2/2016 | Noah | F16K 11/0525 |
| | | | | 137/625.45 |

FOREIGN PATENT DOCUMENTS

| | | |
|---|---|---|
| DE | 202010017811 U1 | 8/2012 |
| DE | 202012007710 U1 | 9/2012 |
| DE | 102013017979 A1 | 6/2015 |
| EP | 0625228 B1 | 1/1999 |
| EP | 1350902 A2 | 10/2003 |
| EP | 2400065 B1 | 4/2013 |
| EP | 2696007 A1 | 2/2014 |
| GB | 2248262 B | 5/1994 |
| GB | 2314580 B | 11/2000 |
| GB | 2430015 A | 3/2007 |
| GB | 2448729 A | 10/2008 |
| GB | 2470923 A | 12/2010 |

OTHER PUBLICATIONS

International Preliminary Report on Patentability of corresponding International Application No. PCT/EP2022/074635 mailed Jan. 24, 2024, all pages cited in its entirety.

* cited by examiner

LIQUID FLOW DIVERTER

TECHNICAL FIELD

The present disclosure relates to a liquid collection device. More specifically, the present disclosure relates to the liquid collection device, having a liquid flow diverter, which may allow collection of a liquid from a drainage pipe or a downpipe.

BACKGROUND

A liquid collection device may be used to collect a liquid (say rainwater) from a drainage pipe or a downpipe. The drainage pipe or the downpipe have generally applications with a building, gardens, and other similar installations. The liquid collection device may collect and communicate the liquid from the downpipe with a liquid reservoir (say a liquid storage tank). Such a liquid collection device may include a liquid flow diverter, which may further include a collection unit and a conduit extending therefrom for connection with the liquid reservoir. The collection unit of the liquid flow diverter may be readily and removably inserted in any downpipe via a drill hole drilled through a wall of the downpipe.

The conventional liquid flow diverter is made up of flexible rubber and poses some limitations during mounting or installation with the downpipe. The collection unit of the flexible rubber liquid flow diverter may not properly or accurately adapt to the wall of the downpipe and may hang in the downpipe at any angle, position, or orientation. The liquid flow diverter may then have a limited, and inadequate capacity to receive and collect the liquid. Thus, the liquid flow diverter may not be utilized to its full capacity and the liquid may not be stored in the liquid reservoir for further usage or application.

An example is provided by GB patent application GB 2470923 A (hereinafter referred to as the '923 reference). The '923 reference discloses a drainage device for draining rainwater from a drainpipe and comprises a conduit having a first end and a second end for channeling the water from the drainpipe. The conduit includes at least one aperture between the first and second ends for receiving the water to be channeled. The device further comprises an anchor having an attaching portion for attaching the anchor to the drainpipe and a coupling portion for coupling to the first end of the conduit. The device also has a clamping device with at least one formation for attaching the clamping device to the pipe and a clamp for clamping the conduit between the first and second ends.

Another example of a liquid collection device is provided in German patent application 10 2013 017 979 A1 (hereinafter referred to as '979 reference). The '979 reference provides a water collection device for collecting water, in particular rainwater, in a downpipe. The water collection device includes a collection unit. The collection unit includes a collection groove made of an elastically deformable material that resets and which may be inserted into the downspout via a lateral insertion opening. The collection unit further includes a drainage socket with a drainage channel made of an elastomeric material. The drainage channel has steep sidewalls which define a channel profile for flow of water. Bottom of the drainage channel incorporates reinforcing webs which provide partial rigidity to the drainage channel. The drainage socket may be connected to the collection groove and may be fixable on the downspout in the region of the insertion opening and via which collected water may drain out of the downspout. Further, the drainage channel has a helix type shape which may be construed as an outward extension of the drainage channel within the downpipe which allows the water collection device to seal with inner surface of the downpipe. The outward extension as such is inherently due to shape of the drainage channel and not provided as a separate part. The '979 reference falls short of providing the collection unit, which may easily and properly adapt to the wall of the downspout. Further, the collection unit may be improperly positioned in the downspout and may not be able to collect the water to its full capacity.

Thus, there is a need of an improved liquid flow diverter i.e., the liquid collection device, which may allow efficient and ergonomic applications with the downpipe.

SUMMARY

In view of the above, it is an objective of the present invention to solve or at least reduce the drawbacks discussed above. The objective is at least partially achieved by a liquid flow diverter. The liquid flow diverter finds applications with a downpipe. The liquid flow diverter includes a body. The body includes a channel profile between a first end and a second end. The channel profile includes a helix shape and allows flow of a liquid therein. The body further includes a liquid outlet associated with the first end of the body. The liquid outlet allows fluid communication of the liquid flow diverter with the downpipe. The body is made of a first material and has a lead of at least a height of the channel profile at its first end. With this invention the term lead is the same as defined with the winding of a screw; that is, the lead describes the change of the ascending profile of the winding during one full 360 degree turn. The liquid flow diverter is characterized in that the channel profile includes an extension for coupling around an outer side of the body. Further, the extension is made of a second material.

Thus, the present disclosure provides a liquid flow diverter that advantageously includes the extension with the downpipe. The extension may provide flexibility feature to the otherwise rigid body and may facilitate good and thorough engagement of the body with the downpipe. The liquid outlet of the liquid flow diverter may be fluidly coupled to a liquid reservoir, even at a remote location, via a hose and the like. Further, the liquid flow diverter due to its material characteristics and improved ergonomics may provide benefits of easy and proper positioning or orientation of the channel profile in the downpipe.

According to an embodiment of the present disclosure, the first material is a partly rigid material. Further, the second material is a partly rigid material. The body being made up of a partly rigid material, and the extension being made up of a partly rigid material allows the extension to snugly fit with the wall of the downpipe and provide a watertight sealing effect. The extension may be made up of a material such as, but not limited to, a rubber, a polymer or the like which may adapt to the shape of the wall of the downpipe. Thus, the channel profile with additional support from the extension may properly adapt to the wall of the downpipe and the liquid collection may be accomplished at full capacity of the channel profile.

According to an embodiment of the present disclosure, the channel profile circumscribes a circumference between its first end and its second end of at least 240 degree.

According to an embodiment of the present disclosure, the liquid outlet of the liquid flow diverter fluidly couples with a drill hole of the downpipe. The liquid outlet may further be fluidly coupled to the liquid reservoir at remote or far-off location via the hose. The liquid via the hose may directly be used for various applications such as irrigation or household activities.

According to an embodiment of the present disclosure, the liquid outlet is a separate part mounted to the first end of the body or is integral to the first end. The liquid outlet of different shape or size may be retrofitted to the first end of the body of the liquid diverter based on implementation or application needs. The removable feature of the liquid outlet may also allow for ease in maintenance of the body as well as the liquid outlet. Alternatively, the liquid outlet may be integrally formed with the body. This may save time and cost associated with the manufacturing.

According to an embodiment of the present disclosure, the extension is one or more of a seal, a compression ring and flexible, water-resistant components. The seal, the compression ring and flexible, water-resistant components such as bristles may provide benefits of adapting the channel profile to the shape of the downpipe and improving the ingress of the liquid in the channel profile.

According to an embodiment of the present disclosure, the body defines a recess or mounting profile, which allows assembly of the extension with the body. The recess or mounting profile may provide secure assembly of the extension with the body of the liquid flow diverter. The recess or mounting profile may also prevent inadvertent fall or disassembly of the extension from the body of the liquid flow diverter.

According to an embodiment of the present disclosure, the body is made of a material selected from one or more of a polymer, a plastic, and the extension is selected from one or more of a polymer. The polymer or plastic material may provide high strength, toughness, or resilience to the body of the liquid flow diverter and the seal. The polymer or plastic material may also provide necessary flexibility for proper insertion of the channel profile of the liquid flow diverter in the downpipe.

According to an embodiment of the present disclosure, the body is made of a rigid hard plastic, and the extension is made of rubber. The channel profile of the liquid flow diverter, made of such rigid hard plastic, may not inadvertently bend in the downpipe during its insertion via the drill hole. Thus, the channel profile may properly or accurately adapt to the wall of the downpipe at an angle, position, or orientation suitable for maximum, efficient, and secure collection of the liquid.

According to an embodiment of the present disclosure, the liquid flow diverter further includes a spout having ribs. The ribs of the spout allow to removably couple the liquid flow diverter with the downpipe. The spout with ribs may be used to properly position or orient the liquid flow diverter with the downpipe. The ribs may be designed such as to ensure proper positioning or orientation of the channel profile in the downpipe when the spout is fixed with the down pipe.

According to an embodiment of the present disclosure, the liquid flow diverter is manufactured through a two-component molding process. Two-component molding process advantageously provides freedom in selecting shape, material, size as well as functional properties of the liquid flow diverter. Through manufacturing via two-component molding, these properties may be appropriately and suitably changed or modified to suit various application areas. The liquid flow diverter may be manufactured as a versatile application product. Further, the extension may also be appropriately paired with the body from the perspective of material selection, dimensional accuracy, elastic properties etc.

Other features and aspects of this invention will be apparent from the following description and the accompanying drawings.

BRIEF DESCRIPTION OF THE DRAWINGS

The invention will be described in more detail with reference to the enclosed drawings, wherein.

DESCRIPTION OF EMBODIMENTS

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention may be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

Figure 1:
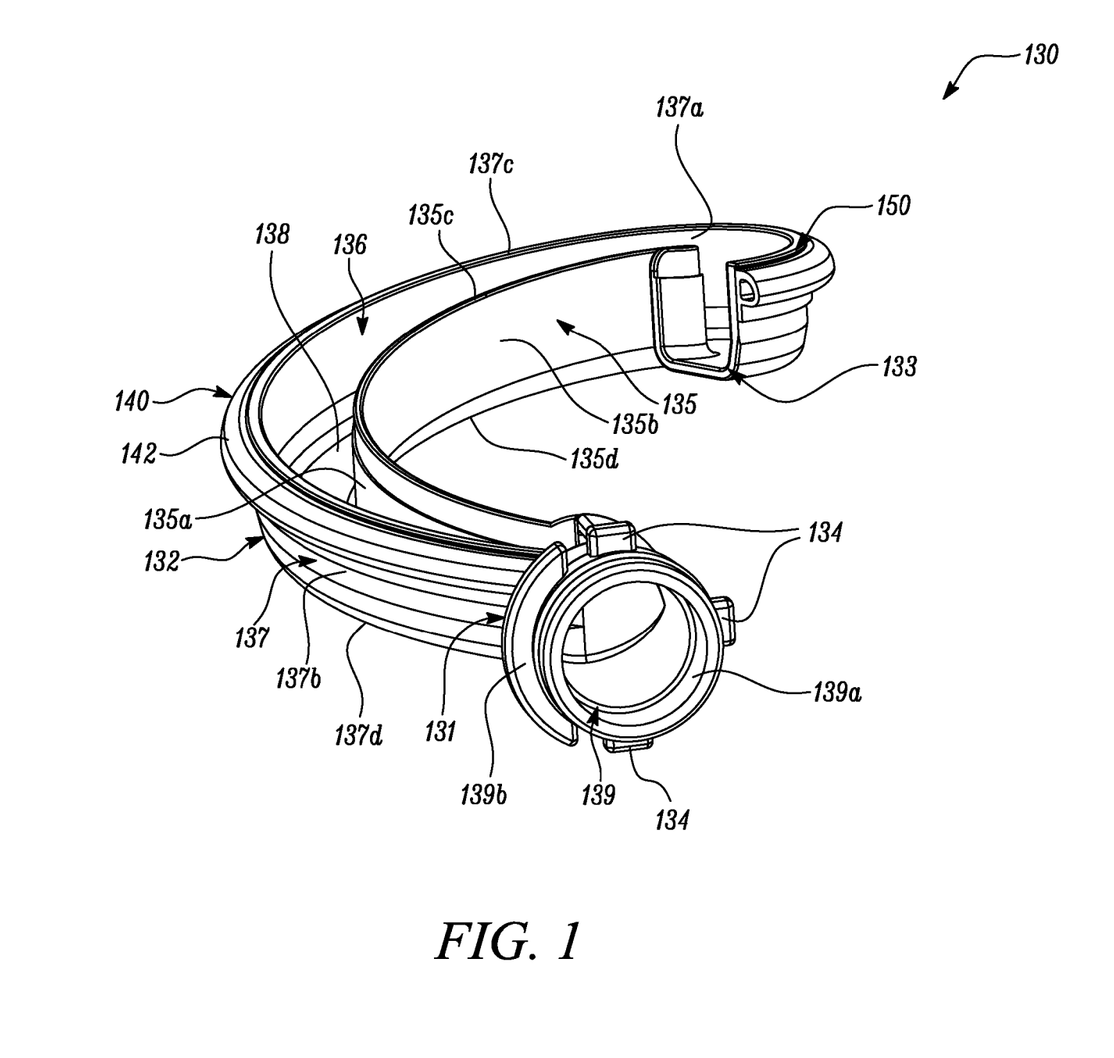
FIG. 1 shows a perspective view of a liquid flow diverter, in accordance with an aspect of the present disclosure.

FIG. 1 illustrates a liquid flow diverter 130 which finds applications with a liquid collection device 100 (best shown in FIGS. 4E, 8) and may allow collection of a liquid from a downpipe 120 (as shown in FIG. 4A-4D). The collected liquid may be transferred to a liquid reservoir (not shown) directly or via a hose (not shown), where the liquid reservoir may be installed at a far off or a remote location. The liquid collection device 100 of the present disclosure include the liquid flow diverter 130 which may have different applications with gardening devices such as the downpipe 120.

Figure 2:
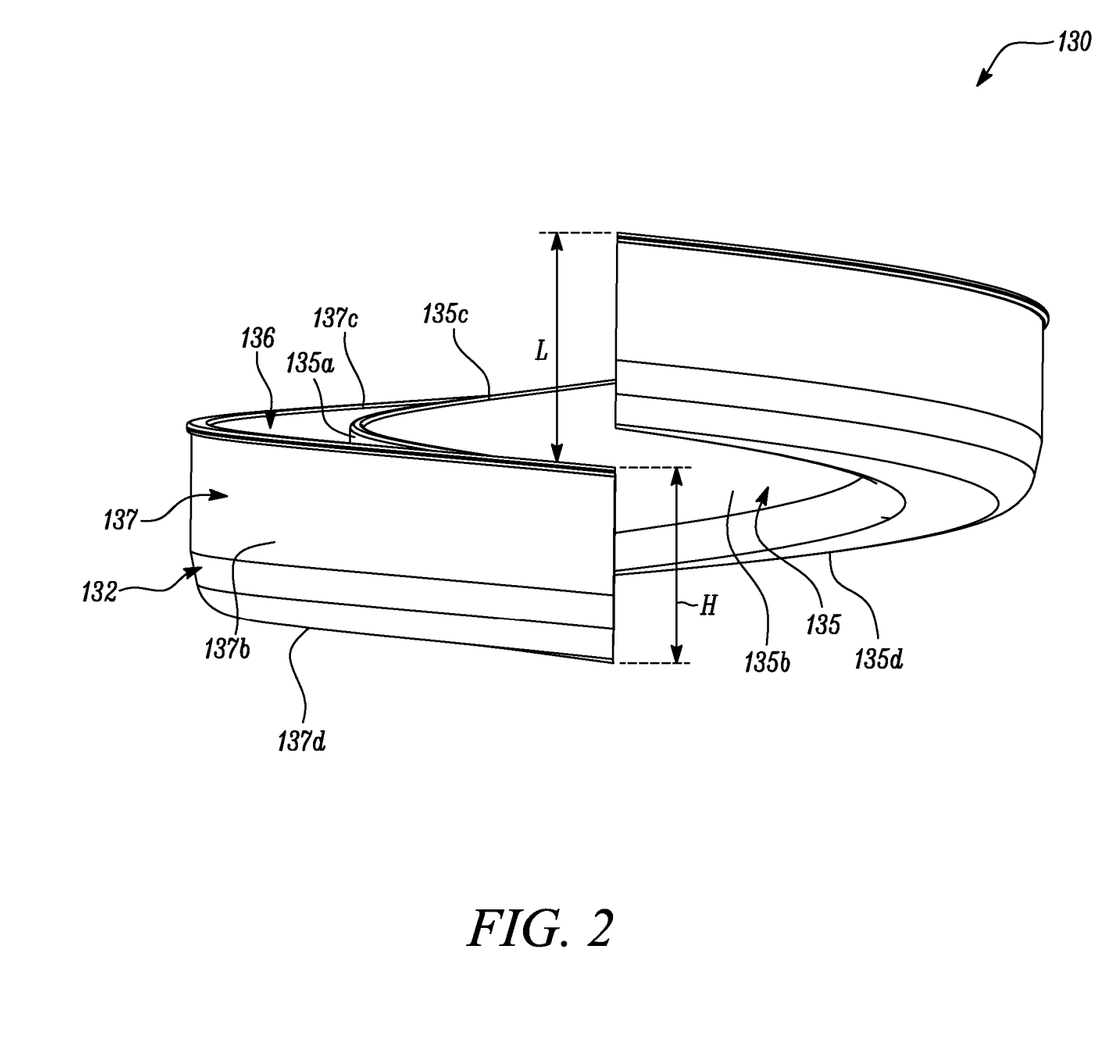
FIG. 2 shows another perspective view of a liquid flow diverter, in accordance with an aspect of the present disclosure.

The liquid flow diverter 130 includes a body 132. The body 132 includes a first end 131, a channel profile 136 for collecting the liquid and a second end 133. The channel profile 136 may be positioned between the first end 131 and a second end 133. The channel profile 136 includes a helix shape and may allow flow of a liquid (say water) therein. The helix shaped channel profile 136 has a lead "L" (as shown in FIG. 2) of at least a height "H" of the channel profile 136 at its first end 131. This defined relation between the lead "L" and the height "H" of the channel profile 136 is necessary to avoid undesired movement of the channel profile 136 in the downpipe 120. In some embodiments, the channel profile 136 may include a U-shape or any shape other than the helix shape.

The channel profile 136 may include a pair of side walls 135, 137 and a bottom surface 138. The pair of side walls 135, 137 may include inner surfaces 135a, 137a respectively and opposed outer surfaces 135b, 137b respectively. Further, the pair of side walls 135, 137 may include top surfaces 135c, 137c respectively and bottom surfaces 135d, 137d respectively. The body 132 further includes a liquid outlet 139 associated with the first end 131. In some embodiments, the liquid outlet 139 is a separate part mounted to the first end 131 of the body 132. The liquid outlet 139 of different shape or size may be retrofitted to the first end 131 of the body 132 of the liquid diverter 130 based on implementation or application needs. The removable feature of the liquid outlet 139 may also allow for case in maintenance of the body 132 as well as the liquid outlet 139. In some embodiments, the liquid outlet 139 is integral to the first end 131. This may save time and cost associated with the manufacturing. Further, in the illustrated embodiment, the liquid outlet 139 is circular in shape and includes an inner side 139a and an outer side 139b. The outer side 139b includes one or more protrusions 134. However, in other embodiments, the liquid outlet may be envisioned with different structural features also which should be contemplated well within the scope of the present disclosure.

The body 132 is made from a first material. In some embodiments, the first material may be a partly rigid material. In the context of the present disclosure, the partly rigid material refers to a material which may have at least some part of composition as a rigid material. In an embodiment, the partly rigid material may be a rigid material. The rigid material may be one or more of a polymer or a plastic. The polymer or plastic material may provide high strength, toughness, or resilience to the body 132. The polymer or plastic material may also provide necessary flexibility for proper insertion of the body 132, particularly the channel profile 136 in the downpipe 120. The body 132 may preferably be made from a rigid hard plastic. Thus, channel profile 136 may not inadvertently excessively bend in the downpipe 120 during its insertion and may be positioned correctly or properly in the downpipe 120.

In another embodiment, the partly rigid material may be a semi-rigid material. The semi-rigid material refers to a material which may have at least some part of composition as a flexible material along with having at least some part of composition as a rigid material. The semi-rigid material may showcase functional properties of both a rigid material and a flexible material and may provide a balance between fully rigid material and a fully flexible material. The present disclosure is not limited by any proportions of material composition for the semi-rigid material.

The body 132 also includes an extension 140 for coupling around the outer surface 137b. More specifically, the channel profile 136 includes the extension 140 for coupling around the outer side 137b of the body 132. Further, the extension 140 is made of a second material. In some embodiments, the second material may be a partly rigid material.

In the context of the present disclosure, the partly rigid material of the extension 140 refers to a material which may have at least some part of composition as a flexible material. In an embodiment, the partly rigid material may be a flexible material. The flexible material may be one or more of a polymer or a plastic. The polymer or plastic material may provide high strength, toughness, or resilience to the extension 140. The polymer or plastic material may also provide necessary flexibility for proper sealing of the extension 140 with the downpipe 120. The extension 140 may preferably be made from a rubber, a polymer or the like. Thus, extension 140 may provide adequate flexibility to adapt inside the downpipe 120 and provide a watertight sealing accordingly.

In another embodiment, the partly rigid material of the extension 140 may be a semi-rigid material. The semi-rigid material refers to a material which may have at least some part of composition as a flexible material along with having at least some part of composition as a rigid material. The semi-rigid material may showcase functional properties of both a rigid material and a flexible material and may provide a balance between fully rigid material and a fully flexible material. The present disclosure is not limited by any proportions of material composition for the semi-rigid material.

Figure 3A:
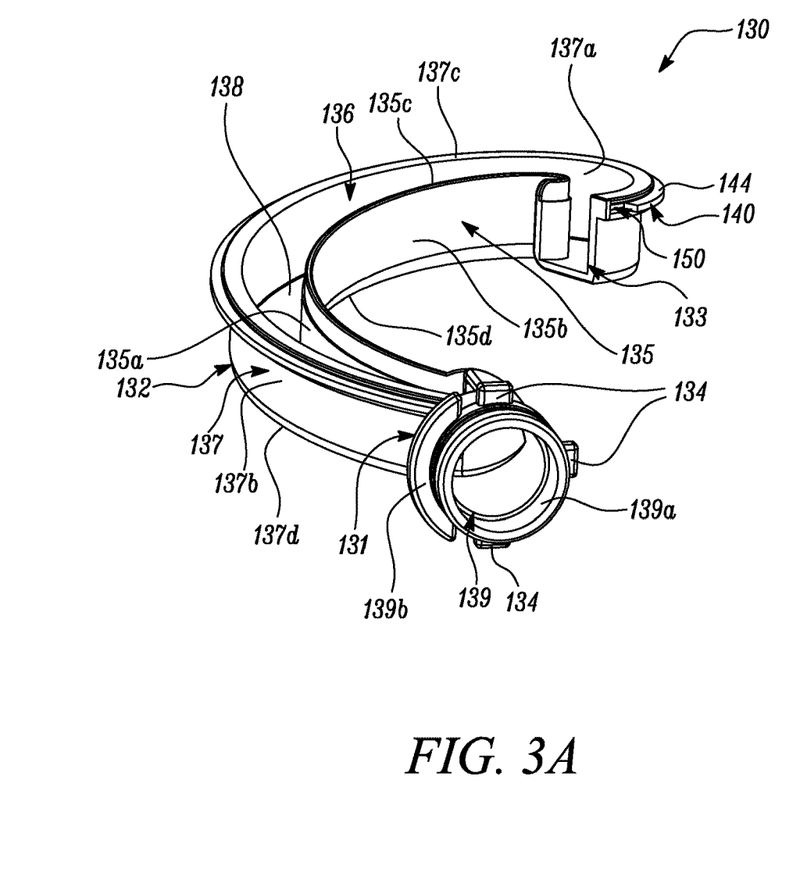
FIG. 3A shows a perspective assembled view of a liquid flow diverter and a compression ring, in accordance with an aspect of the present disclosure.
Figure 3B:
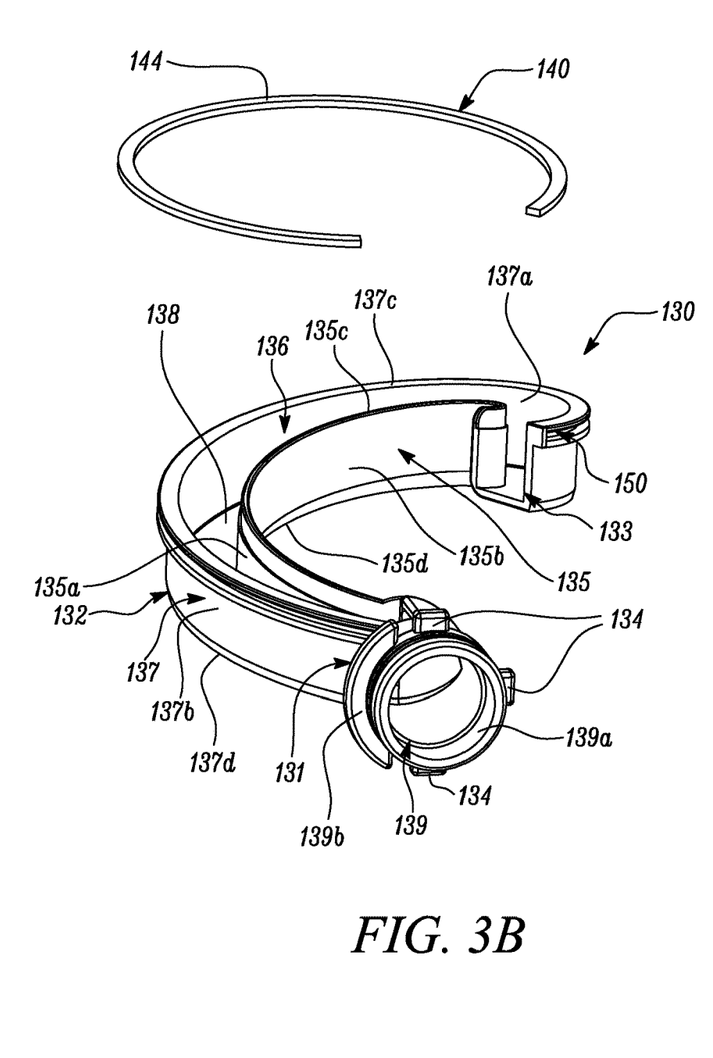
FIG. 3B shows a perspective disassembled view of a liquid flow diverter and a compression ring, in accordance with an aspect of the present disclosure.

The extension 140 may add flexibility feature to the otherwise rigid body 132 and may facilitate good and thorough engagement of the body 132 with the downpipe 120. The extension 140 is one or more of a seal 142, a compression ring 144 (as shown in FIGS. 3A and 3B) and flexible, water-resistant components (not shown). The seal 142, the compression ring 144 and flexible, water-resistant components such as bristles may provide benefits of adapting the channel profile 136 to the shape of the downpipe 120 and improving the ingress of the liquid in the channel profile 136. In some embodiments, the extension 140 may be made from one or more of a polymer or a rubber. The extension 140 of the present disclosure includes a circular cross-section. However, actual implementation of the present disclosure may have any type, number, dimensions, shape, or cross-section of the extension 140.

Further, the extension 140 is the part of the liquid flow diverter 130 which comes in direct contact with an inner wall 120a of the downpipe 120. Therefore, the extension 140 should be provided in such a way that the extension 140 creates a fluid-tight sealing between the inner wall 120a of the downpipe 120 and the liquid flow diverter 130 so that none of the liquid escapes the liquid flow diverter 130 and is diverted towards the channel profile 136 for further usage and applications. Thus, the extension 140 is appropriately provided with suitable material properties, adaptable shape and flexibility to be able to fulfill the required functionality therein.

Figure 4A:
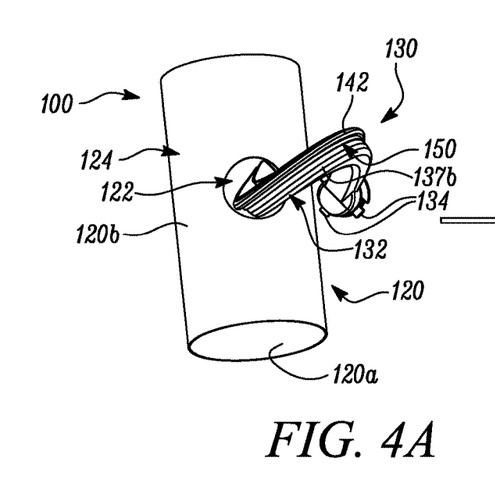
FIGS. 4A, 4B, 4C, 4D and 4E show various views for assembly of a liquid flow diverter with a downpipe, in accordance with an aspect of the present disclosure.
Figure 4B:
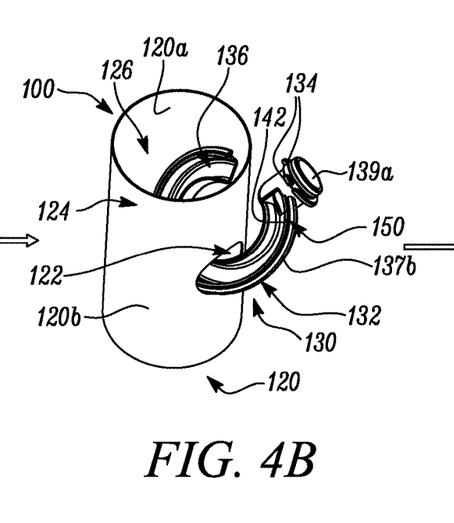
Figure 4C:
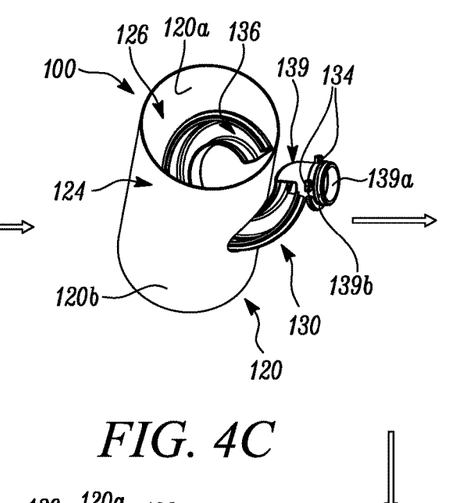
Figure 4D:
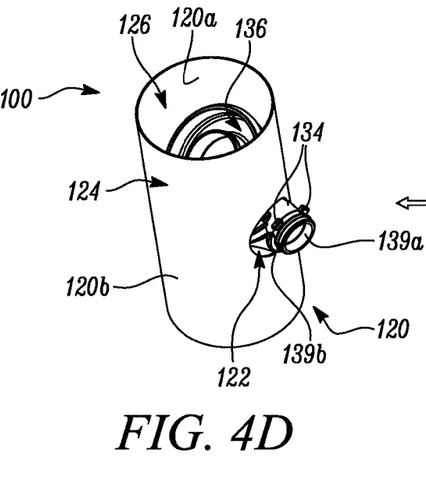
Figure 4E:
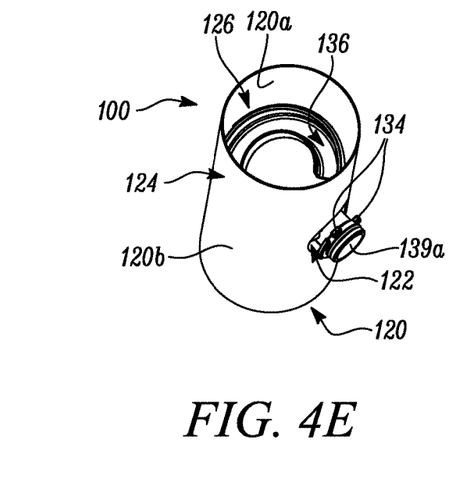

FIGS. 4A, 4B, 4C, 4D and 4E illustrate the various stages of assembly of the liquid flow diverter 130 in the downpipe 120. The liquid flow diverter 130 may be readily and removably inserted in the downpipe 120 via a drill hole 122 thereof. The insertion may be continued until the channel profile 136 is fully inside the downpipe 120 and the one or more protrusions 134 of the liquid outlet 139 abuts a portion of an outer wall 120b of the downpipe 120 around the drill hole 122. Once the channel profile 136 is inserted in the downpipe 120 as illustrated in FIGS. 4A to 4C, the liquid flow diverter 130 may be partially rotated such as to bring the channel profile 136 in the proper orientation to receive the liquid in the downpipe 120 as illustrated in FIGS. 4D to 4E. Further, once the channel profile 136 is in the proper orientation, the extension 140 may fully engage with the inner wall 120a of the downpipe 120. The extension 140 may facilitate secure mounting or engagement of the channel profile 136 of the liquid flow diverter 130 with the inner wall 120a of the downpipe 120.

In some embodiments, the extension 140 may be removably mounted or assembled with the body 132 (or the channel profile 136) of the liquid flow diverter 130. The assembly of the extension 140 may be allowed by a recess or mounting profile 150 defined in the outer surface 137b of the side wall 137 of the channel profile 136. The recess 150 may provide secure assembly of the extension 140 with the body 132 of the liquid flow diverter 130. The recess 150 may further prevent inadvertent fall or disassembly of the extension 140 from the body 132 of the liquid flow diverter 130. The recess 150 may have dimensions such as to facilitate friction or snap fit of the extension 140 therein. The extension 140 may also be engaged with the recess 150 using a glue or other fastening means known in the art. In some embodiments, the extension 140 may be 1-2 mm below the top surface 137c of the body 132 as per requirement. In some embodiments, the extension 140 may be around the top surface 137c of the body 132.

Figure 5A:
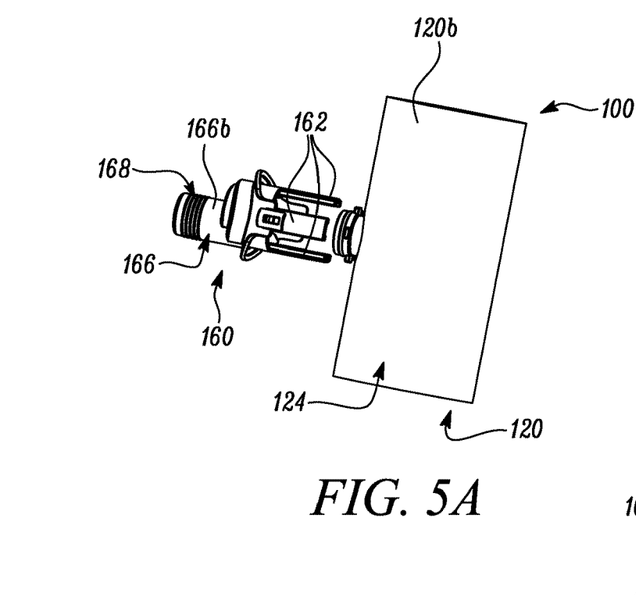
FIGS. 5A, 5B and 5C show various views for coupling of a spout with a liquid flow diverter, in accordance with an aspect of the present disclosure.
Figure 5B:
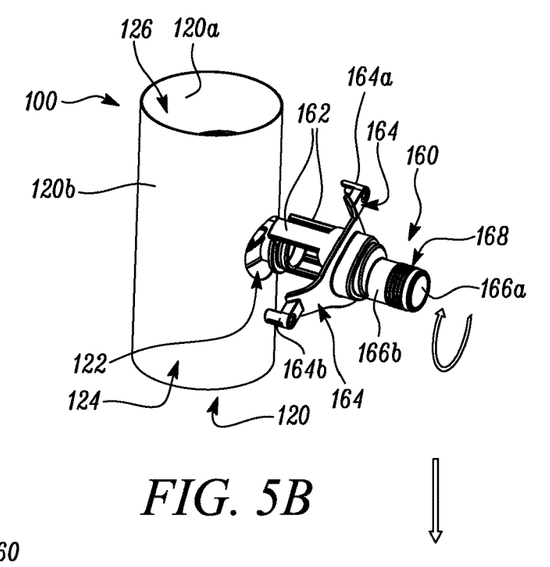
Figure 5C:
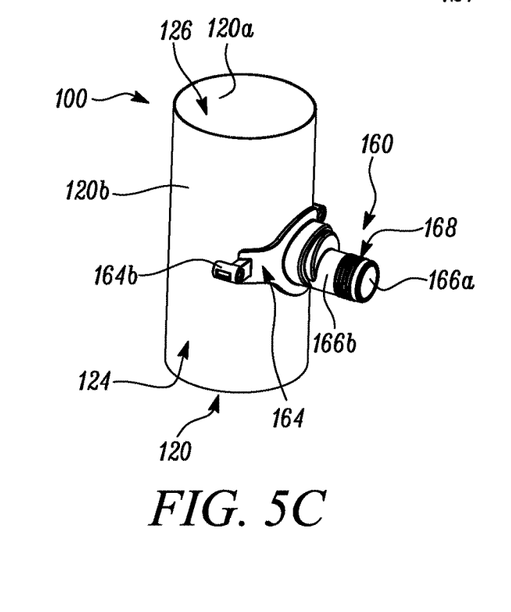

FIGS. 5A, 5B and 5C illustrate the liquid collection device 100 having the downpipe 120 mounted with the liquid flow diverter 130. The liquid flow diverter 130, or the liquid collection device 100 further includes a spout 160. The spout 160 may include a pair of arms 164, ribs 162, and a pipe 166. The pipe 166 may include an inner surface 166a and an outer surface 166b. The outer surface 166b may include a series of circular protrusions 168. The ribs 162 of the spout 160 may allow to removably couple the liquid flow diverter 130 with the downpipe 120. The ribs 162 may be designed such as to ensure proper positioning or orientation of the channel profile 136 of the liquid flow diverter 130 in the downpipe 120 when the spout 160 is fixed with the down pipe 120. The present disclosure includes three ribs 162. However, actual implementation of the present disclosure may have any type, number, dimensions, or shape of the ribs 162.

The ribs 162 may engage with the outer side 139b of the liquid outlet 139, such as by snap fit, press fit or by any means known in the art. The spout 160 with the ribs 162 may then be partially rotated and pushed towards the downpipe 120 such as to allow a fluid communication between the liquid outlet 139 and the pipe 166. Subsequently, the liquid flow diverter 130 may properly position or orient with the downpipe 120. Thus, the liquid flow diverter 130 or particularly the channel profile 136 may properly or accurately adapt to the inner wall 120a of the downpipe 120 at an angle, position, or orientation suitable for maximum possible collection of the liquid. Further, the liquid outlet 139 of the liquid flow diverter 130 may fluidly couple with the drill hole 122 of the downpipe 120.

Figure 6:
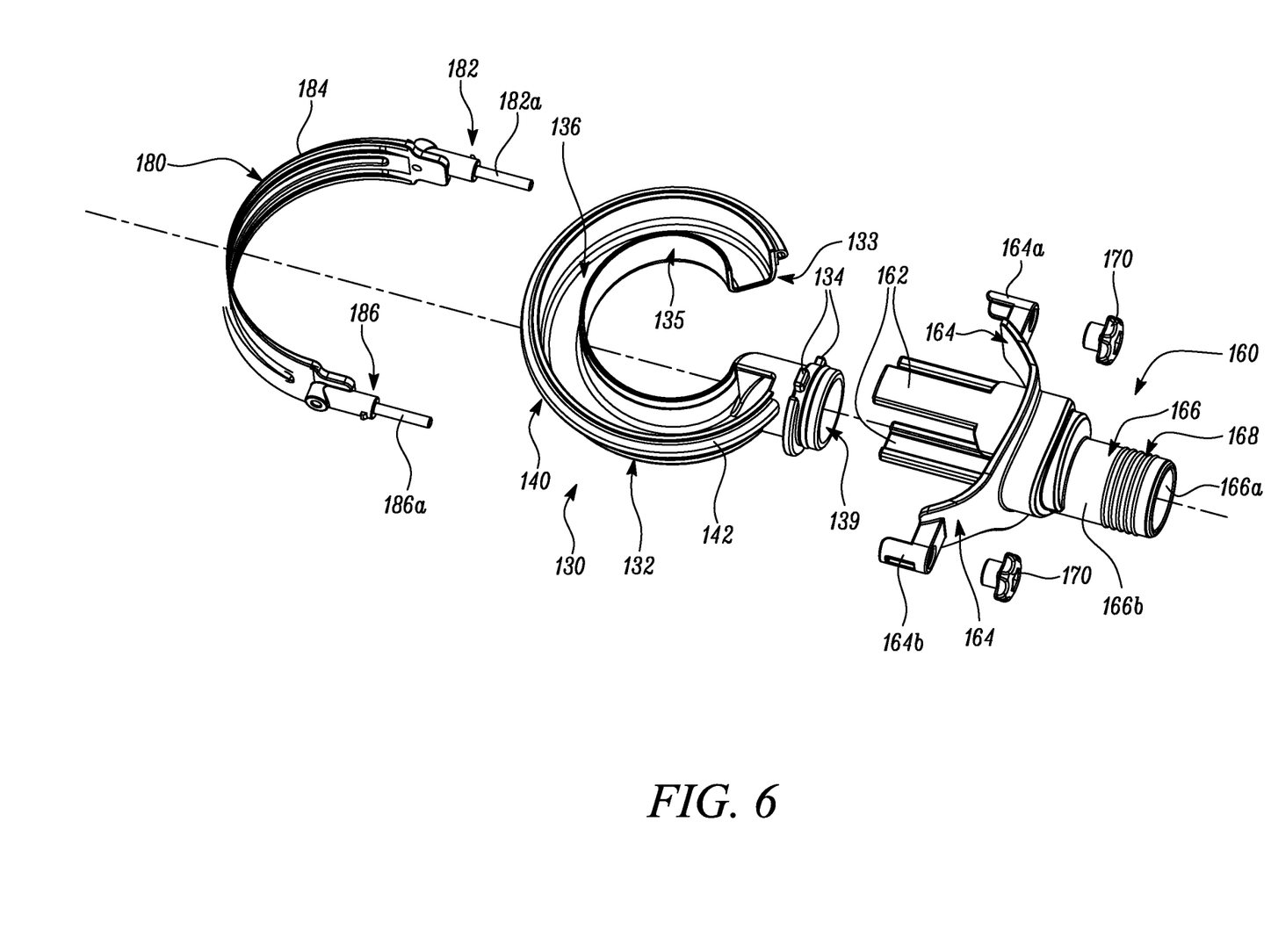
FIG. 6 shows an exploded view of a spout with respect to a liquid flow diverter, in accordance with an aspect of the present disclosure.
Figure 7:
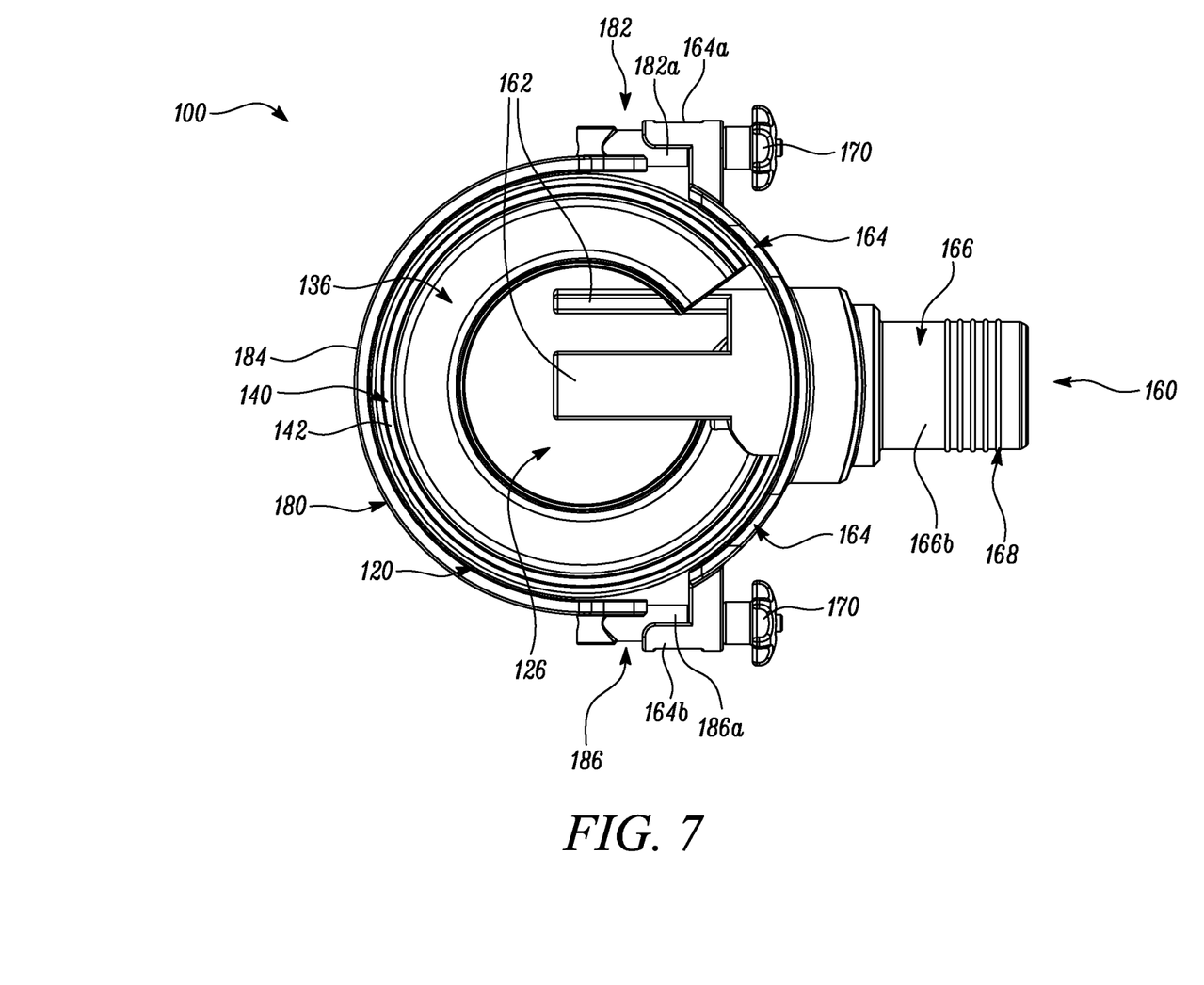
FIG. 7 shows a top perspective view of mounting of a liquid flow diverter with a downpipe, in accordance with an aspect of the present disclosure.
Figure 8:
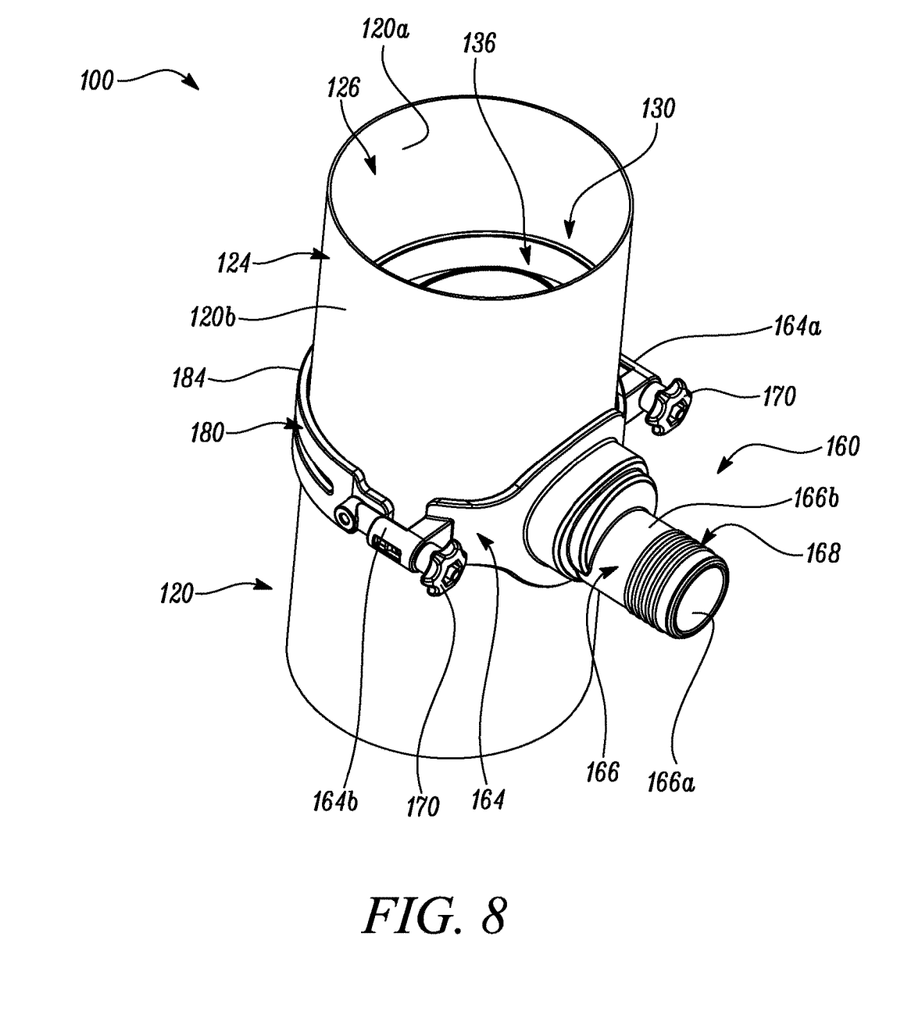
FIG. 8 shows a perspective view of the mounting of a liquid flow diverter with a downpipe, in accordance with an aspect of the present disclosure.

In some embodiments, to mount the spout 160 and the liquid flow diverter 130 assembly with the downpipe 120, a belt 180 may be provided. The belt 180 (as shown in FIG. 6) may include a first end 182, a body 184 and a second end 186. The body 184 may adapt to the shape of the outer wall 120b of the downpipe 120 and may consequently wrap around it. The first end 182 and the second end 186 may respectively include engaging elements 182a and 186a. The engaging elements 182a and 186a may respectively pass and extend through fingers 164a and 164b of the pair of arms 164 of the spout 160. The engaging elements 182a and 186a may then be respectively fastened to the fingers 164a and 164b using a pair of caps 170. Further, the spout 160 and the liquid flow diverter 130 may be securely installed with the downpipe 120 using the belt 180 to provide the liquid collection device 100 as illustrated in FIGS. 7 and 8.

During implementation, on installation or mounting of the liquid flow diverter 130 with the downpipe 120, the liquid (say rainwater) may fall in the downpipe 120. A portion of the falling liquid may be collected in the helix shaped channel profile 136 of the liquid flow diverter 130 while the remaining liquid may flow through a hollow space 126 in the downpipe 120. The collected liquid may be supplied to an external water reservoir (say a water tank) via the pipe 166 in fluid communication with the liquid outlet 139.

In some embodiments, the outer surface 166b of the pipe 166 may be coupled with a liquid dispenser or even a tap (not shown). The coupling may take place by engagement of the tap with the series of circular protrusions 168. In some embodiments, the outer surface 166b of the pipe 166 may be coupled with a hose (not shown). The coupling may take place by engagement of the hose with the series of circular protrusions 168. The liquid via hose may then be supplied to any liquid reservoir installed nearby or at any remote location.

In some embodiments, a housing (not shown) may be rotatably connected to the outer surface 166b of the pipe 166. The coupling may take place by engagement of the housing with the series of circular protrusions 168. The housing may include two pipe sockets and a metering unit. The liquid from the pipe 166 may flow through the metering unit. The metering unit may then regulate (automatically or based on user-input) the quantity or flow of the liquid to the liquid reservoir via one of the pipe sockets. The other pipe socket may be used for connection with a liquid source such as a fresh water tap in absence of any liquid naturally falling in the downpipe 120.

In some embodiments, the outer surface 166b of the pipe 166 may be coupled with a pump (not shown). The pump may ease the transport of the liquid from the liquid flow diverter 130 to the liquid reservoir placed installed at the remote location via the hose. The liquid via the hose may directly be used for various applications such as irrigation or household activities.

Thus, the present disclosure provides the liquid flow diverter 130 with the helix shaped channel profile 136. Due to the helix shape of the channel profile 136, the liquid therein may flow under the influence of gravity towards the liquid outlet 139 of the liquid flow diverter 130. The extension 140 may add flexibility feature to the otherwise rigid body 132 and may facilitate good and thorough engagement of the body 132 with the downpipe 120. The liquid outlet 139 of the liquid flow diverter 130 may be fluidly coupled to the liquid reservoir at the far off or the remote location via the hose. Further, the liquid flow diverter 130 due to its material characteristics and the extension 140, may provide benefits of easy and proper positioning or orientation of the channel profile 136 in the downpipe 120. Thus, the channel profile 136, with adept support from the extension 140, may properly adapt to the wall 124 of the downpipe 120 and the liquid collection may be accomplished at full capacity of the channel profile 136.

According to another embodiment of the present disclosure, the liquid flow diverter 130 is manufactured through a two-component molding process. More specifically, the liquid flow diverter 130 may be manufactured through a bi-injection molding process. In this process, more than one material is fed into a mold cavity at different times, through different gates of the mold. The different materials begin to harden before a meeting point inside a cavity within the mold, which thereafter results in a layered effect. In this process, materials are not expected to physically mix with each other, rather the injection speed of the materials in the mold, meeting point, and material selection subsequently determines final appearance, function and finish of the component being manufactured.

With context of the present disclosure, the body 132 includes the extension 140 for sealing with the downpipe 120, whereas the prior art includes a main body with an integrally formed extended portion on the top of the main body such that the extended portion functions as a sealing with respect to a downpipe. The body 132 of the present disclosure is manufactured from the first material and the extension 140 is manufactured from the second material whereas the above-mentioned main body of the prior art with its extended portion is manufactured from solely one material.

The two-component molding process according to the present invention may advantageously provide freedom in selecting shape, material, size as well as functional properties of the liquid flow diverter 130. Through manufacturing via two-component molding, these properties may be appropriately and suitably changed or modified to suit various application areas. The liquid flow diverter 130 may be manufactured as a versatile application product. Further, the second material of the extension 140 may also be appropriately paired with the first material of the body 132 from the perspective of material selection, dimensional accuracy, elastic properties etc. to better suit the need of a particular application area.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 Liquid Collection Device
120 Downpipe
120a Inner Wall
120b Outer Wall
122 Drill Hole
124 Wall
126 Hollow Space
130 Liquid Flow Diverter
131 First End
132 Body
133 Second End
134 Protrusions
135 Side Wall
135a Inner Surface
135b Outer Surface
135c Top Surface
135d Bottom Surface
136 Channel Profile
137 Side Wall
137a Inner Surface
137b Outer Surface
137c Top Surface
137d Bottom Surface
138 Bottom Surface
139 Liquid Outlet
139a Inner Side
139b Outer Side
140 Extension
142 Seal
144 Compression Ring
150 Recess/Mounting Profile
160 Spout
162 Ribs
164 Arms
164a Finger
164b Finger
166 Pipe
166a Inner Surface
166b Outer Surface
168 Protrusions
170 Cap
180 Belt
182 First End
182a Engaging Element
184 Body
186 Second End
186a Engaging Element
L Lead
H Height

The invention claimed is:

1. A liquid flow diverter for a downpipe, comprising:
a body including a channel profile between a first end and a second end, wherein the channel profile has a helix shape and allows flow of a liquid therein;
wherein channel profile includes a pair of side walls and a bottom surface,
wherein the pair of side walls includes inner surfaces respectively and opposed outer surfaces respectively,
a liquid outlet associated with the first end of the body, wherein the liquid outlet allows fluid communication of the liquid flow diverter with the outside of the downpipe,
the body is made of a first material, with the channel profile having a lead of at least a height of the channel profile at its first end;
wherein the channel profile includes an extension for coupling around an outer side of the body, wherein the extension is made of a second material,
wherein the body either defines a recess or a mounting profile to enable assembly of the extension with the body, or
the liquid flow diverter is manufactured through a two-component molding process, wherein the second material of the extension is paired with the first material of the body.

2. The liquid flow diverter of claim 1, wherein the first material is a partly rigid material.

3. The liquid flow diverter of claim 1, wherein the second material is a partly rigid material.

4. The liquid flow diverter of claim 1, wherein the channel profile circumscribes a circumference between the first end and the second end of at least 240 degrees.

5. The liquid flow diverter of claim 1, wherein the liquid outlet is a separate part mounted to the first end of the body or is integral to the first end.

6. The liquid flow diverter of claim 1, wherein the extension is one or more of a seal, a compression ring and flexible, water-resistant components.

7. The liquid flow diverter of claim 6, wherein the body is made of a rigid hard plastic, and the extension is made of rubber.

8. The liquid flow diverter of claim 1, wherein the body is made of a material selected from one or more of a polymer or a plastic, and the extension is selected from one or more of a polymer.

9. The liquid flow diverter of claim 1, wherein the liquid flow diverter further includes a spout having ribs, wherein the ribs of the spout allow to removably couple the liquid flow diverter with the downpipe.

10. A liquid flow diverter for a downpipe, comprising:
a body including a channel profile between a first end and a second end, wherein the channel profile has a helix shape and allows flow of a liquid therein;
wherein channel profile includes a pair of side walls and a bottom surface,
wherein the pair of side walls includes inner surfaces respectively and opposed outer surfaces respectively,
a liquid outlet associated with the first end of the body, wherein the liquid outlet allows fluid communication of the liquid flow diverter with the outside of the downpipe,
the body is made of a first material, with the channel profile having a lead of at least a height of the channel profile at its first end;
wherein the channel profile includes an extension for coupling around an outer side of the body, wherein the extension is made of a second material,
wherein the liquid flow diverter further includes a spout having ribs to facilitate the mounting of a spout;
wherein the body either defines a recess or a mounting profile to enable assembly of the extension with the body, or
the liquid flow diverter is manufactured through a two-component molding process, wherein the second material of the extension is paired with the first material of the body.

11. The liquid flow diverter of claim 10, wherein the ribs of the spout allow to removably couple the liquid flow diverter with the downpipe.

\* \* \* \* \*